(12) United States Patent
Koh et al.

(10) Patent No.: US 8,798,588 B2
(45) Date of Patent: Aug. 5, 2014

(54) TERMINAL AND METHOD FOR PROVIDING ZONE-BASED SERVICE OUTSIDE OF SERVICE ZONE

(75) Inventors: Yunji Koh, Seoul (KR); Jinsung Im, Seoul (KR); Kangsoo Shin, Seoul (KR); Dukho Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 13/254,998

(22) PCT Filed: Sep. 1, 2010

(86) PCT No.: PCT/KR2010/005915
§ 371 (c)(1),
(2), (4) Date: Sep. 6, 2011

(87) PCT Pub. No.: WO2012/030000
PCT Pub. Date: Mar. 8, 2012

(65) Prior Publication Data
US 2012/0244888 A1 Sep. 27, 2012

(51) Int. Cl.
*H04M 3/42* (2006.01)
(52) U.S. Cl.
USPC ............... 455/414.1; 455/412.1; 455/422.1; 455/456.1
(58) Field of Classification Search
USPC ........ 455/403, 414.1, 418, 419, 422.1, 432.3, 455/433, 434, 435.1, 435.2, 456.1, 456.2, 455/556.1, 556.2, 566, 412.1
See application file for complete search history.

(56) References Cited

U.S. PATENT DOCUMENTS

| 8,139,742 | B2* | 3/2012 | Klos et al. ............... 379/201.12 |
| 2003/0073441 | A1* | 4/2003 | Fattouch ........................ 455/446 |
| 2004/0224682 | A1* | 11/2004 | Kang .............................. 455/433 |
| 2005/0059379 | A1* | 3/2005 | Sovio et al. ................... 455/411 |
| 2006/0178146 | A1* | 8/2006 | Lee et al. ...................... 455/435.1 |
| 2007/0121850 | A1* | 5/2007 | Klos et al. ................. 379/114.28 |
| 2008/0113683 | A1* | 5/2008 | Paas et al. .................. 455/552.1 |
| 2008/0126529 | A1 | 5/2008 | Kim et al. |
| 2008/0200143 | A1* | 8/2008 | Qiu et al. ..................... 455/404.2 |
| 2009/0164547 | A1* | 6/2009 | Ch'ng et al. .................. 709/201 |
| 2010/0075610 | A1 | 3/2010 | Dennard et al. |

FOREIGN PATENT DOCUMENTS

| KR | 10-0545874 B1 | 1/2006 |
| KR | 10-0547371 B1 | 1/2006 |
| KR | 10-0786489 B1 | 12/2007 |
| KR | 10-0839537 B1 | 6/2008 |

* cited by examiner

*Primary Examiner* — Jean Gelin
(74) *Attorney, Agent, or Firm* — Birch, Stewart, Kolasch & Birch, LLP

(57) ABSTRACT

Disclosed is a terminal comprising a memory; a display; and a controller configured to: store log information for a service provided within a service zone in the memory; extract connection information corresponding to the service from the log information if an input requesting for the service is received outside the service zone; and display the connection information extracted from the log information on the display.

17 Claims, 5 Drawing Sheets

TERMINAL AND METHOD FOR PROVIDING ZONE-BASED SERVICE OUTSIDE OF SERVICE ZONE

TECHNICAL FIELD

The present disclosure relates to an apparatus and method for providing a location-based service and, more particularly, to a terminal and a method for providing a service related to a particular zone.

BACKGROUND ART

As a recent mobile terminal has diverse functions, it is implemented as a multimedia player equipped with complex features, such as capturing images or video, reproducing music or video files, gaming, receiving broadcast signals, and the like.

Multimedia services provided by mobile terminals include location-based services that are provided on the basis of the location of a terminal, such as a location tracking service, a location-based information providing service, a vehicle navigation service, and the like. In general, the location-based service is provided relying on the location of a mobile terminal acquired by a location measurement device such as a GPS installed in the mobile terminal.

DISCLOSURE OF THE INVENTION

The present disclosure is to provide a method for providing, by a terminal, zone-based services related to a particular service zone.

The present disclosure is to provide a method for accessing, by a terminal, a zone-based service that is provided within a particular service zone when the terminal is located outside of the particular service zone.

Also, the present disclosure is to provide a method of displaying, by a terminal, information regarding zone-based services that the terminal can access when the terminal is located outside of a particular service zone.

To achieve these and other advantages and in accordance with the purpose of the present invention, as embodied and broadly described herein, there is provided a terminal comprising a memory; a display; and a controller configured to: store log information for a service provided within a service zone in the memory; extract connection information corresponding to the service from the log information if an input requesting for the service is received outside the service zone; and display the connection information extracted from the log information on the display.

The connection information may be information for an application program required for the service or information for accessing the service.

The controller may be configured to display on the display an icon or an image corresponding to the application program required for the service.

The log information may include the name of the service, a usage time of the service, or the connection information of the service.

The controller may be further configured to: perform a search of the connection information with a search factor; and display a result of the search of the connection information on the display.

The search factor may include a service usage time, usage counts by the service zone, a favorites list of the service, or a search word used as the input.

The service zone may be an area in which a server operated therein is accessed by way of wireless communication, and wherein the controller is further configured to receive the log information for the service customized for the service zone from the server and store the log information received from the server in the memory.

The controller may be configured to receive the log information of the service that has been provided within the service zone or the log information of the service that has been set according to the input.

the service that has been set according to the input may be a selected part of the service provided within the service zone or all the accessible services within the service zone.

To achieve these advantages, there is also provided a method for providing a service of a terminal, the method comprising: storing log information for a service provided within a service zone; extracting connection information corresponding to the service from the log information if an input requesting for the service is received outside the service zone; and displaying the connection information extracted from the log information.

The connection information may be information for an application program required for the service or information for accessing the service.

In displaying the connection information extracted, an icon or an image corresponding to the application program required for the service may be displayed on a display.

The log information may include the name of the service, a usage time of the service, or the connection information of the service.

The method may further comprise: performing a search of the connection information with a search factor; and displaying a result of the search of the connection information, wherein the search factor includes a service usage time, usage counts by the service zone, a favorites list of the service, and a search word used as the input.

To achieve these, there is also provided a server comprising: a service database configured to store log information for a service within a service zone; and a controller configured to transmit the log information to a terminal, wherein the log information includes the name of a service, a usage time of the service, or the connection information of the service, and wherein the connection information is used by the terminal to access the service zone and comprises information for an application program required for using the service or information for accessing the service.

According to the exemplary embodiments of the present invention, the terminal can access a location-based service related to a particular geographical area from outside of a service zone in which the service is provided or even from outside of the particular geographical area. The terminal provides information required for a user to effectively select and access the service at the outside of the service zone in which the location-based service related to the particular geographical area is provided.

The foregoing and other objects, features, aspects and advantages of the present invention will become more apparent from the following detailed description of the present invention when taken in conjunction with the accompanying drawings.

MODES FOR CARRYING OUT THE PREFERRED EMBODIMENTS

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast receivers, PDAs (Personal Digital Assistants), PMPs (Portable Multimedia Player), navigation devices, and the like. It would be understood by a person in the art that the configuration according to the embodiments of the present invention can be also applicable to the fixed terminals such as digital TVs, desk top computers, or the like, except for any elements especially configured for a mobile terminal.

Figure 1:
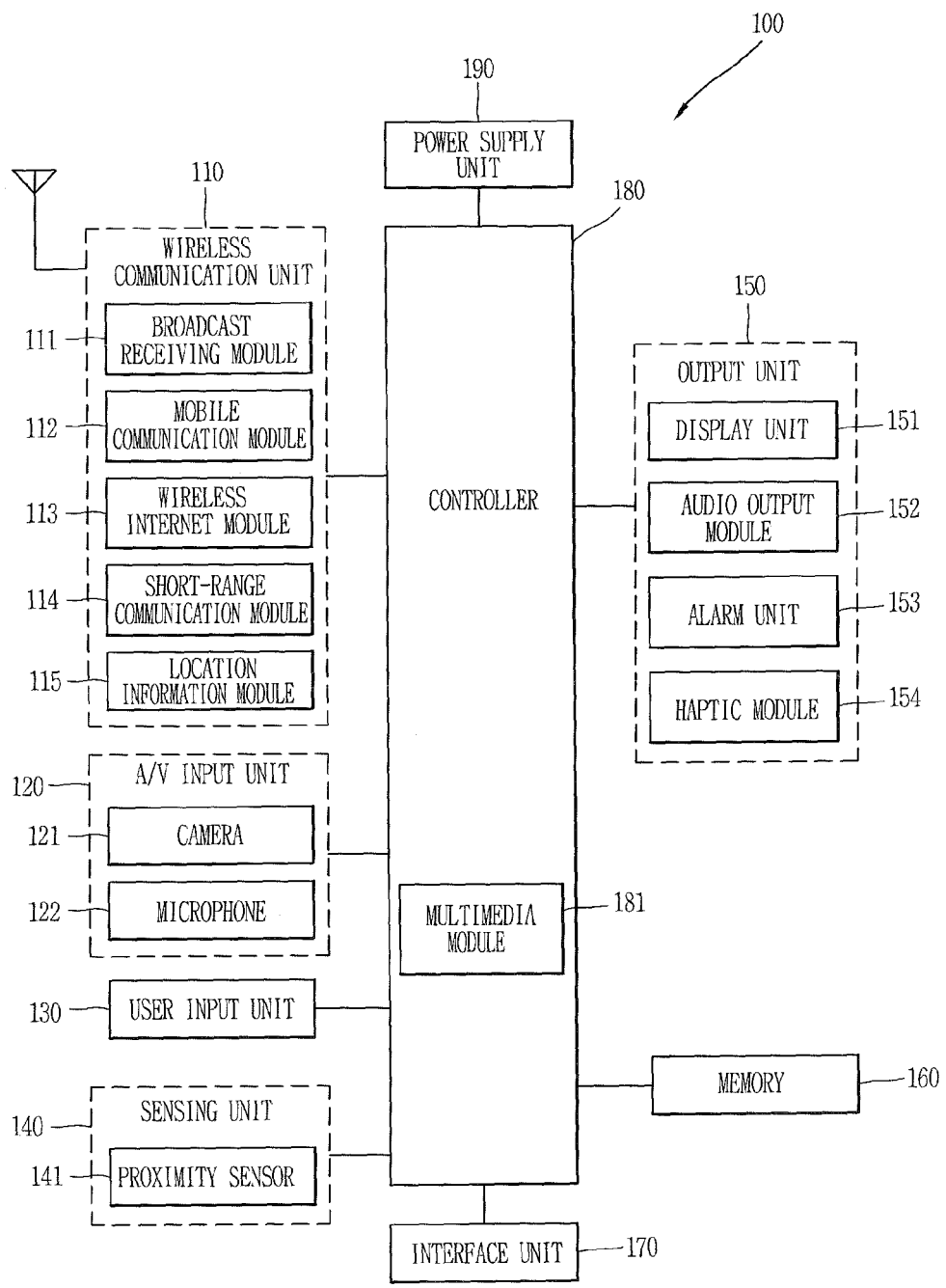
FIG. 1 is a block diagram of a mobile terminal related to the embodiments described in the present disclosure.

FIG. 1 is a block diagram of a mobile terminal related to the embodiments described in the present disclosure.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal.

The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). With reference to FIG. 1, the A/V input unit 120 is configured to receive an audio or video signal. The NV input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100

(e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Exemplary embodiments related to a control method that can be implemented in the terminal configured as described above will now be described in detail. The exemplary embodiments described hereinafter may be used alone or may be combined to be used. The exemplary embodiments described hereinafter may be combined with the foregoing user interface so as to be used.

Figure 2:
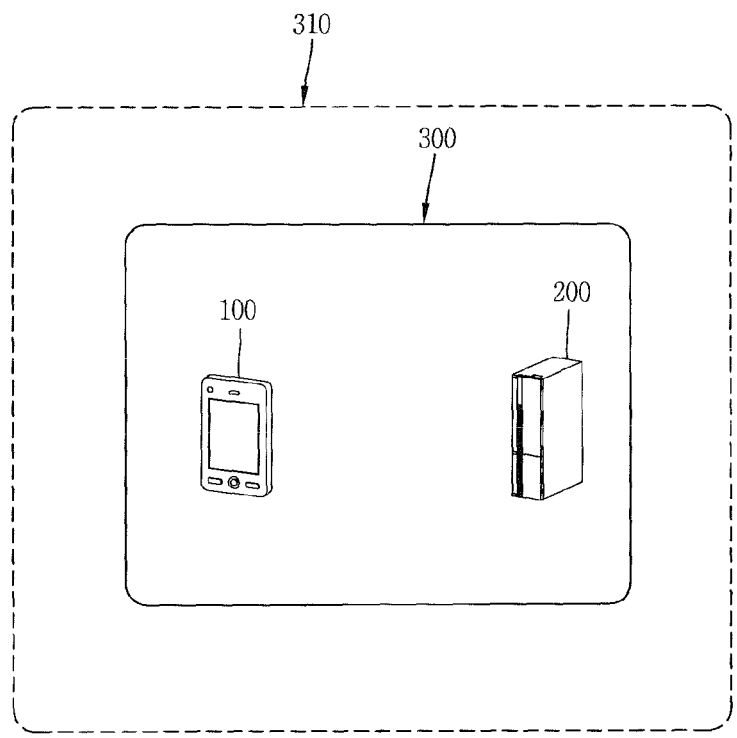
FIG. 2 is an exemplary view illustrating the configuration of a system for providing a zone casting service according to an exemplary embodiment of the present invention.

FIG. 2 is an exemplary view illustrating the configuration of a system for providing a zone casting service according to an exemplary embodiment of the present invention.

A zone casting service disclosed in the present disclosure will be illustrated with reference to FIG. 2. The system for providing a zone casting service may be configured to include a terminal 100 and a server 200.

The zone casting service is a zone-based service where the terminal 100 receives service information from the server 200, the service information is related to a certain service zone 300, and the terminal 100 executes a zone casting application (an application program) to provide the received service information to the user. In particular, the zone casting service provides the information customized for a specific geographical area 310 where the service zone 300 is located. For example, the zone casting service may be the service for providing information regarding goods or services information with priority given to those provided in the specific geographical area 310. Hereinafter, a service refers to the zone casting service.

The geographical area 310 may represent the interior of a particular building or a particular geographical region. For example, as to the goods or services provided in a single building, such as a hotel and a department store, the geographical area 310 may refer to the single building. Likewise, as to the goods or services that are provided in many buildings within a certain geographical region, such as a shopping mall, the geographical area 310 may also refer to the certain geographical region.

The service zone 300 refers to an area where the terminal can have access a network established in a particular geographical area and can be provided with the zone casting service for the particular geographical area through the zone casting server 200. For example, the service zone 300 may refer to the entirety of the geographical area, which is a building such as a department store, a theater and a hotel, or the entirety of a certain regional area. In another example, the service zone 300 may be a part of the geographical region where a service related to a particular store or a particular floor of a building within the geographical area is provided as the zone casting service.

The server 200 provides customized information for the geographical area 310, to which the service zone 300 belongs, to the terminal 100 located within the service zone 300. The server 200 may be implemented with two different servers, a local server (or an area server) 210 located in the interior of the service zone 300 and an external server 200 located outside of the service zone 300, but the local server 210 and the external server 220 are logically separated and they may be implemented in a single server as well.

The terminal 100 may use a wired/wireless communication scheme to be connected to a network for a communication with the server 200 in the service zone 300. To this end, the controller 180 of the terminal 100 may control the wireless communication unit 110 to perform the communication with the server 200.

For example, the controller 180 may perform a wireless communication with the server 200 by controlling the wireless Internet module 113 such as WLAN (Wi-Fi) and WiBro, or by controlling the short-range communication module 114 supporting short-range communication schemes such as Bluetooth. Also, the controller 180 may perform a wireless communication with the server 200 by controlling the mobile communication module 112 supporting a mobile communication network.

Also, the service information refers to any information related to a service, such as a service corresponding to the service zone, a service list and contents regarding the service. Here, the service corresponding to the service zone may be expressed in various manners such as icons, images and text.

The zone casting application is an application program for receiving the zone casting service, which can be used in any place of the service zone. Also, the zone casting application may be installed in the terminal before it is initially used, or may be automatically or manually downloaded from a server providing the zone casting application and installed after the terminal enters the service zone.

Figure 3:
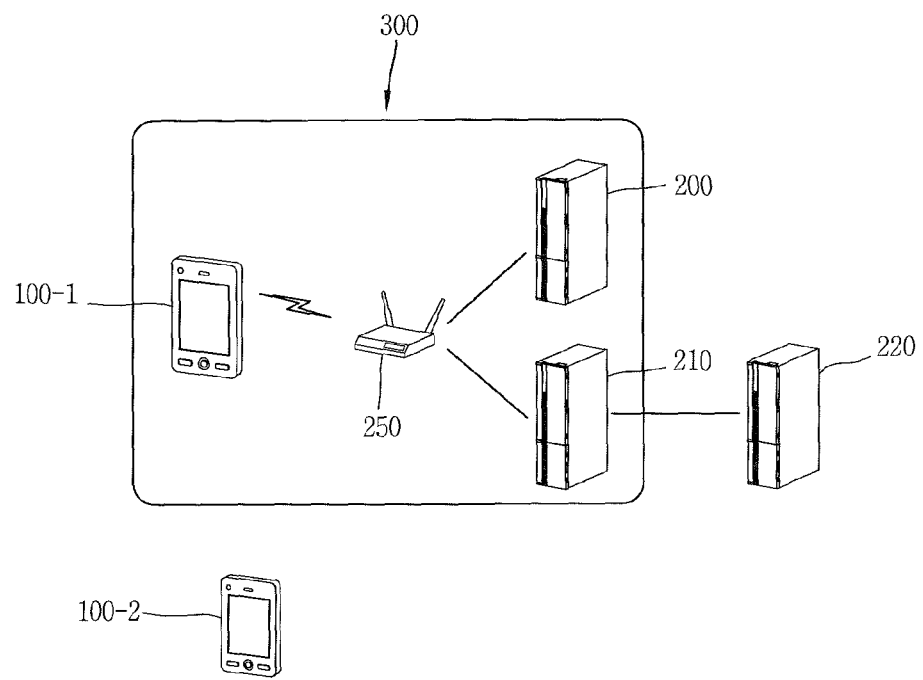
FIG. 3 is an exemplary view illustrating the configuration of the system for providing a zone casting service according to an exemplary embodiment of the present invention.

FIG. 3 is an exemplary view illustrating the configuration of the system for providing a zone casting service according to an exemplary embodiment of the present invention. A method whereby the terminal according to the exemplary embodiment of the present invention interworks with the server providing the zone casting service within or outside the service zone will now be described in detail.

The system for providing the zone casting service according to an exemplary embodiment of the present invention may include the terminal 100, the server 200, and an access point 250.

When the terminal 100 enters into a service zone 300, the terminal 100-1 may determine whether or not the zone casting service is provided in the service zone 300 and inform results by the determination in a visual, audible, or tactile form. For example, the terminal 100-1 may inform by way of a text, an image, an icon, vibration, a voice, and the like whether or not the zone casting service is provided in the service zone 300.

After the terminal 100 enters into the service zone 300, when an input signal requesting for the zone casting service is received, the terminal 100-1 searches for access points corresponding to the service zone 300. Thereafter, the terminal 100-1 establishes a connection to a server, which provides service information of the service zone, through one of the access points searched.

The server 200 works as a part of a network established in the service zone 300, and in this disclosure accessing the server 200 may also mean as accessing a network. Thus, accessing the server should be interpreted to have the same meaning as accessing the network hereinafter.

The input signal requesting for the service may be an input for executing a zone casting application on the terminal 100-1. The input signal requesting for the service may be in various manners such as in the form of voice signal, a signal for selecting the zone casting application displayed on the screen, a signal of the terminal's movement, and the like.

The server 200 may be implemented with two servers; a local server 210 located within the service zone and an external server 220 located outside the service zone.

The local server 210, which is a server installed within the service zone, stores service information corresponding to the service zone. Also, the local server 210 provides service information stored in the terminal connected to the local server 210.

The local server 210 stores the service information corresponding to the service zone using a database (DB) with various information fields such as a type of the service, a place the service is provided, and the like. Here, the information fields of the database stored in the local server 210 can correspond to service information provided within the service zone, a place or a particular area where the local server 210 is located.

For example, if the service zone indicates a hotel, the local server may store various types of service information, such as regional information around the hotel, room service information and restaurant information provided in the hotel in the form of database.

The external server 220 refers to a server that stores location information of the service zone where the zone casting service is provided in the form of database. The external server 220 may be located outside of the service zone where the terminal is currently located, but it may be also located within the service zone.

Here, if a terminal 100 is located outside of the service zone, the terminal 100-2 may acquire, from the external server 220, the location of the closest service zone for the zone casting service from the current location. Namely, after the location information of the terminal 100-2 which is acquired from the location information module 115 of the terminal 100-2 is transmitted to the external server 220, the location information of the service zone located nearby in which the zone casting service may be received from the external server on the basis of the location information of the terminal 100-2. The terminal 100-2 may use various communication schemes such as short-range communication, mobile communication, and the like to establish the connection to the external server 220.

The access point 250 is a wireless communication device allowing the terminal to access the local server 210. The access point 250 uses independent power and includes a module capable of a short-range communication. Also, location information of an area where the access point 250 is located is stored in the local server 210. In the present disclosure, the access point 250 of the zone casting service providing system is described to be supporting Wi-Fi scheme as an exemplary embodiment, but other wireless access schemes for short-range communication such as NFC/RFID, ZigBee™ and Bluetooth™ can be applicable to the access point 250 as well.

Thereafter, a method of determining whether or not the terminal 100 is located within the service zone 300 will now be described by using the access point 250 supporting wireless LAN (WLAN) scheme, namely, Wi-Fi scheme as an example.

The zone casting service providing system using the access point 250 of the WLAN scheme may be configured to include the terminal 100 and the access point 250 providing wireless communication to the terminal 100. Also, the zone casting service providing system using the access point 250 of the WLAN scheme may be configured to include routers for routing data packets based on IP address information of the data packets, a DHCP (Dynamic Host Configuration Protocol) server for allocating and managing IP addresses, an SIP (Session Initiation Protocol) proxy server for managing information on neighboring access points of the access point 250 if any, and an authentication server (AS) for authenticating the terminal 100 and the access point 250 using an 802.11X protocol.

The zone casting service providing system using the access point 250 of the WLAN scheme may be a system in compliance with the IEEE 802.11 standard.

The service zone 300 may be an area in which a basic service set (BSS) in compliance with IEEE 802.11 standard is formed, and the operation mode of a WLAN in the service zone 300 may have a form of infrastructure BSS. In this case, the access point 250 located within the service zone 300 may be involved in radio communication with the terminal 100-1, a station located within the service zone 300, and the terminal 100-1 may determine whether or not it is within the particular service zone 300 by checking a BSS IDentifier (BSSID), for example a MAC address of the access point 250, included in data used for radio communication within the service zone 300 in which the terminal 100-1 is located.

The service zone 300 may be an area in which an Extended Service Set (ESS) in compliance with the IEEE 802.11 standard is formed, where the ESS is an extended service area formed by connecting one or more BSSs, and the access point 250 located within the service zone 300 may be configured as one or more access points having the same Service Set IDentifier (SSID). In this case, the terminal 100-1 can determine whether or not it is within the particular service zone 300 by checking the SSID used for radio communication within the service zone 300 in which the terminal 100-1 is located.

Also, when the terminal 100-1 connected to the access point 250 uses IP based communication, an IP address within a particular range may be assigned to the terminal 100-1 by a DHCP server which is running either in the access point 250 or separately for the service zone 300. In this case, the server 200 may determine whether or not the terminal 100-1 is located in the particular service zone 300 by checking an IP address of the terminal 100-1 exchanging information to provide the zone casting service, and the terminal 100-1 can also determine whether or not it is located within the particular service zone 300 by checking the IP address assigned for itself or by requesting the server 200 which is, as described above, aware of the service zone the terminal 100-1 is located to send information on the service zone.

Besides, in the zone casting service providing system using the access point 250 in compliance with the IEEE 802.11 standard, the terminal 100 may determine whether or not the terminal 100 is located within a certain service zone based on various information such as channel information of communication with the access point 250, signal strength information, location information recognized in the relation with access points, and the like.

In a different exemplary embodiment, besides the zone casting service providing system using the schemes in compliance with the IEEE 802.11 standard, the terminal 100 may determine whether or not the terminal 100 itself is located within the particular service zone 300 by transmitting location information of the terminal 100 to the server 200, wherein the location information is acquired from the location information module 115 of the terminal 100; receiving from the server 200 information regarding a service zone to which the terminal 100 belongs, wherein the information regarding the service zone is based on the location information of the terminal 100; and checking the information regarding the service zone. In this case, the terminal 100 may use the wireless communication unit 110, in particular, the mobile communication module 112 or the short-range communication module 114, to communicate with the server 200. Also, the server 200 may be the external server 220 that stores and manages information regarding the service zone in which the zone casting service is provided.

Figure 4:
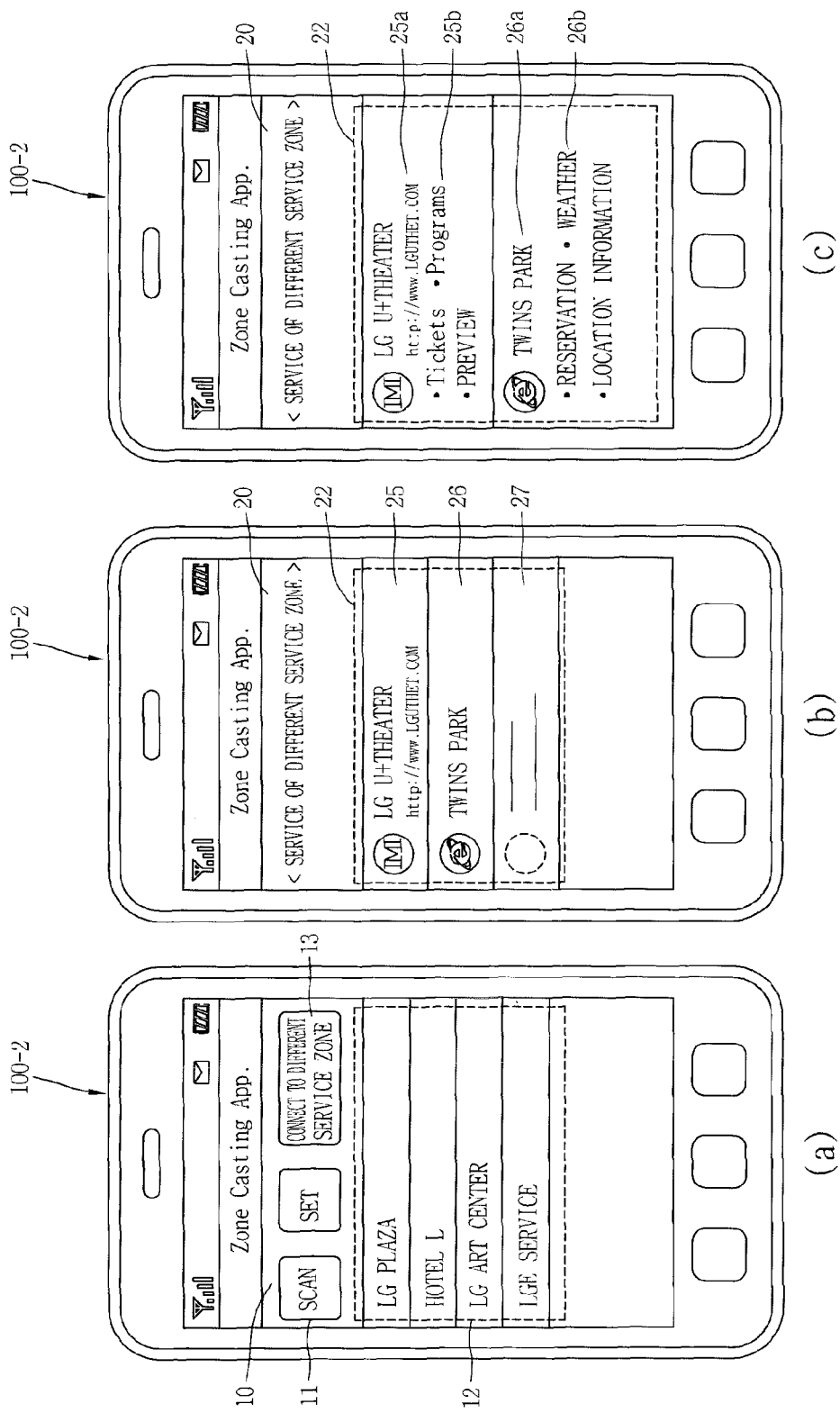
FIG. 4 is an exemplary view of service connection information at the outside of a service zone by a terminal, an exemplary embodiment of the present invention.

FIG. 4 is an exemplary view of service connection information at the outside of a service zone by a terminal, an exemplary embodiment of the present invention. A method for displaying a service provided in the service zone 300 when the terminal 100 is located outside the service zone 300 will now be described with reference to (a) and (b) of FIG. 4.

As described above, the controller 180 can determine whether or not the terminal 100 is located within the particular service zone 300. According to a result of the determination, if the terminal 100 is located outside the service zone 300, the controller 180 may not receive a service list from the server 200 that can be provided if the terminal 100 is located within the service zone 300. In this case, the controller 180 may display service information of the service zone 300 based on log information stored in the memory of the terminal 100 according to an input signal for selecting a menu displaying service information provided in a different service zone. The log information will be described with reference to FIG. 4(*b*).

For example, with reference to FIG. 4(a), the controller 180 provides control to display an execution screen 10 of a zone casting application including a service list on the display unit. The execution screen 10 includes a menu 11 for receiving a service provided within the service zone where the terminal 100 is currently located, a part 12 for displaying a list of services provided within the service zone in which the terminal 100 is currently located, and a menu 13 for displaying a service provided in a service zone other than the service zone in which the terminal 100 is currently located.

In the case of the terminal 100-2 located outside the service zone 300 in FIG. 3, a service list provided in the service zone 300 is not displayed on the service list display part 12 of the execution screen 10 of the zone casting application. In this case, when a request for displaying service information of a different service zone is requested through an input of selecting the menu 13, the controller 180 displays an execution screen 20 for displaying a service provided in the different zone on the display unit 151 as shown in FIG. 4(b).

For example, with reference to FIG. 4(b), the execution screen of the zone casting application includes a part 22 of displaying a list of services provided in the different service zone. The service list display part 22 displays connection information of respective services extracted from log information of the services provided in the different service zone.

Log information of the respective services may include a name of a service, a usage time of a service, a recent usage time, the number of usages, and connection information for a connection from outside of a service zone. Also, the connection information may include service access information (URL) and application program information required for a connection outside the service zone in which the respective services are provided.

The service access information may be an address for accessing the service from outside of the service zone where the service is provided, or an address for accessing an alternative service of the service. The zone casting service provides customized information for a geographical area that a particular service zone for the service belongs to, so an alternative service in a different format from those of the services provided in the service zone may be provided to the terminal which wants to use the service outside the service zone in which the respective services are provided. The service access information may be an address expressed in the form of a URL (Uniform Resource Locator).

The application program information includes types of applications required for accessing the service from outside of the service zone in which the respective services are provided. An application program executed by the terminal to use a service outside the service zone is not only the zone casting application, but may include a Web browser or any other application programs as well.

For example, with reference to FIG. 4(b), after the controller 180 of the terminal 100-2 located outside the service zone 300 in FIG. 3 receives a request input signal, the controller 180 may extract connection information 25 of a theater related service and connection information 26 of a an amusement park related service from the log information of the services stored in the memory 160, and may display the connection information 25, 26 on the service list display part 22 for the different service zone.

As to the terminal located outside the service zone, application program information is used for accessing each service when the terminal is located outside the service zone, and the application program information among the connection information may be displayed in the form of an icon or an image corresponding to each application program on the service list display part 22. Thus, the controller 180 may display an icon of a dedicated application program for the service to show the connection information 25 of the theater related service, or may display an icon of a Web browser to show the connection information 26 of the service related to an amusement park.

Also, with respect to the terminal located outside the service zone, the service access information among the connection information may be displayed on the service list display part 22. Thus, for example, the controller may display a URL which can be accessed from outside of the service zone 300 to show the connection information 25 of the service related to a theater.

Also, when the terminal receives a request for displaying a service provided in the different service zone other than the service zone in which the terminal is currently located, the controller 180 of the terminal may provide control not to display, on the service list display part 22, a service that does not contain a connection information among log information which is required for the use at the outside of the service zone, or to display information indicating that the service cannot be used from the outside of the service zone, along with service information. For example, the information indicating that the service cannot be used may be displayed such that its application program information is not displayed (27) or the color of the part showing the service information is different from the color of other service information having connection information.

Even when there exists connection information required to be used outside the service zone in which the service is provided among the log information regarding the respective services, the controller 180 of the terminal, according to a user request or automatically, may determine whether or not the terminal can actually access the service by using the access information (URL) included in the connection information, and provide control to display information (not shown) indicating the determination results together.

In FIG. 4(b), as to the zone casting service providing system according to an exemplary embodiment of the present invention, the controller 180 of the terminal 100-2 provides control to display separately the service list display part 22 of the other service zone, but alternatively, the controller 180 may provide control to display the list of another zone casting services provided in the service zone in which the terminal 100-2 is currently located along with, but differently, the connection information of the service provided in the foregoing other service zone (not shown).

With reference to FIG. 4(c), the log information of the services stored in the memory 160 may include service information of the respective services, such as detailed services, a part of contents provided through the respective services, and the like. Thus, the controller 180 of the terminal 100-2 located outside the service zone 300 may provide control to display services information regarding the services besides the connection information of the respective services on the service list display part 22 of the different service zone.

For example, the controller 180 may provide control to display, on the service list display part 22 of the different service zone, connection information 25a of a service related to a theater and connection information 26a of a service related to an amusement park, along with detailed service information 25b of the service related to the theater and detailed service information 26b of the service related to the amusement park.

Figure 5:
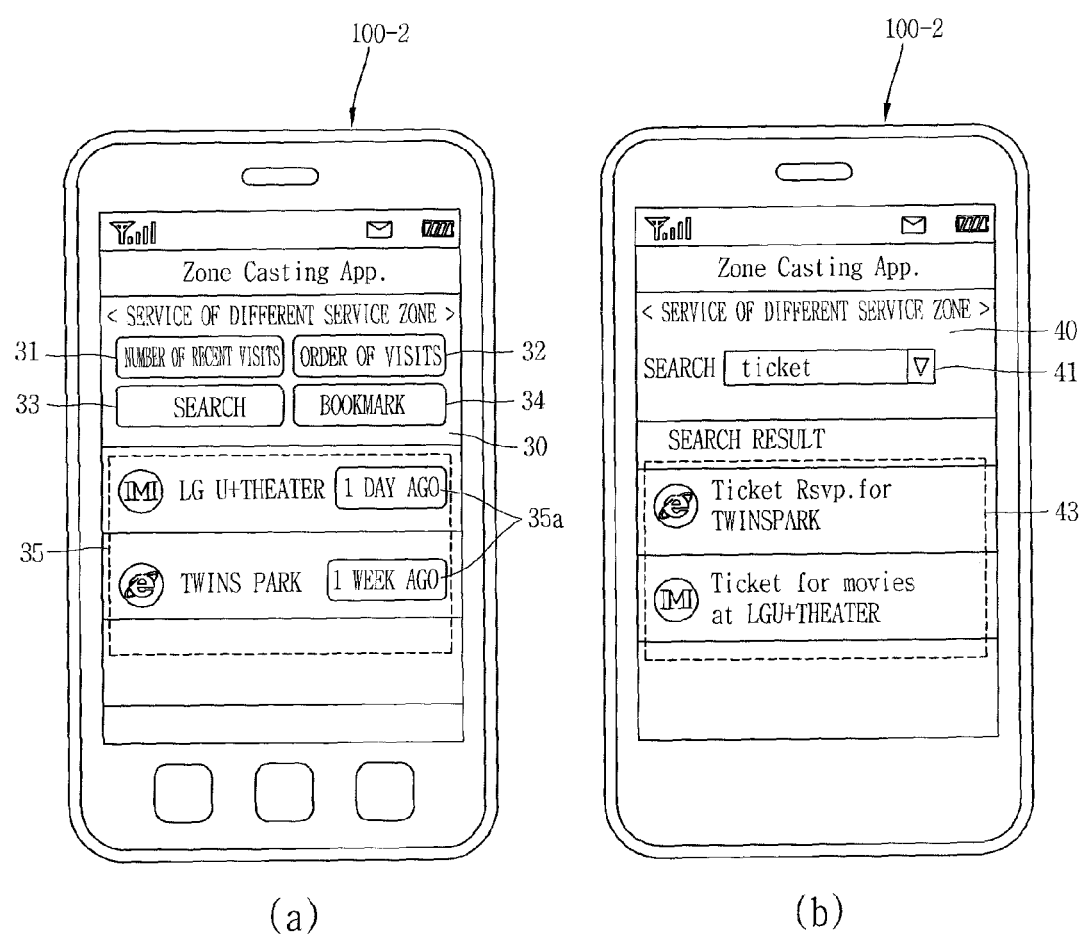
FIG. 5 is an exemplary view of search results for service connection information at the outside of a service zone by a terminal, an exemplary embodiment disclosed in the present document.

FIG. 5 is an exemplary view of search results for service connection information at the outside of a service zone by a terminal, an exemplary embodiment disclosed in the present document.

With reference to FIG. 5(a), the controller 180 of the terminal 100-2 may provide control to display a first search screen 30, an execution screen of a zone casting application, on the display unit 150 in order to perform searching on the log information stored in the memory 160.

The first search screen 30 may include menus for selecting one or more search keys or factors, e.g., a menu 31 for selecting a recent visit (or usage) time as a search factor, a menu 32 for selecting the number of visits (or usage) as a search factor, a menu 33 for selecting a search word as a search factor, a menu 34 for selecting a favorites list set by the user as a search factor, and the like. Also, the first search screen 30 may include a search result display part 35 displaying the results obtained by performing searching in association with the one or more search factors.

For example, when the controller 180 receives an input for selecting the menu 31 for selecting the recent visit time as a search factor, the controller 180 may provide control to sort connection information of the respective services on the basis of the recent visit time of each of the respective services extracted from the log information of the respective services and display the search result on the display part 35. In this case, the controller 180 may provide control to display (35a) the recent visit time of each of the services along with the connection information of each of the services.

With reference to FIG. 5(b), the controller 180 of the terminal 100-2 may provide control to display a second search screen 40, an execution screen of a zone casting application, on the display unit 150 in order to extract, from the log information stored in the memory 160, connection information of services related to a search word, which is based on an input signal received by the user input unit 130 and to display the connection information extracted.

The second search screen 40 may include an input search word display part 41 and a search result display part 43. The controller 180 may search a service related to a search word, which is used as the input, from the log information stored in the memory 160 by using the search word as a search factor, and provide control to display connection information of the searched service on the search result display part 43. Here, the connection information of the searched service may be displayed in the order of the association with the input search word, or may be displayed on the basis of another sorting schemes by the search factors described above.

Figure 6:
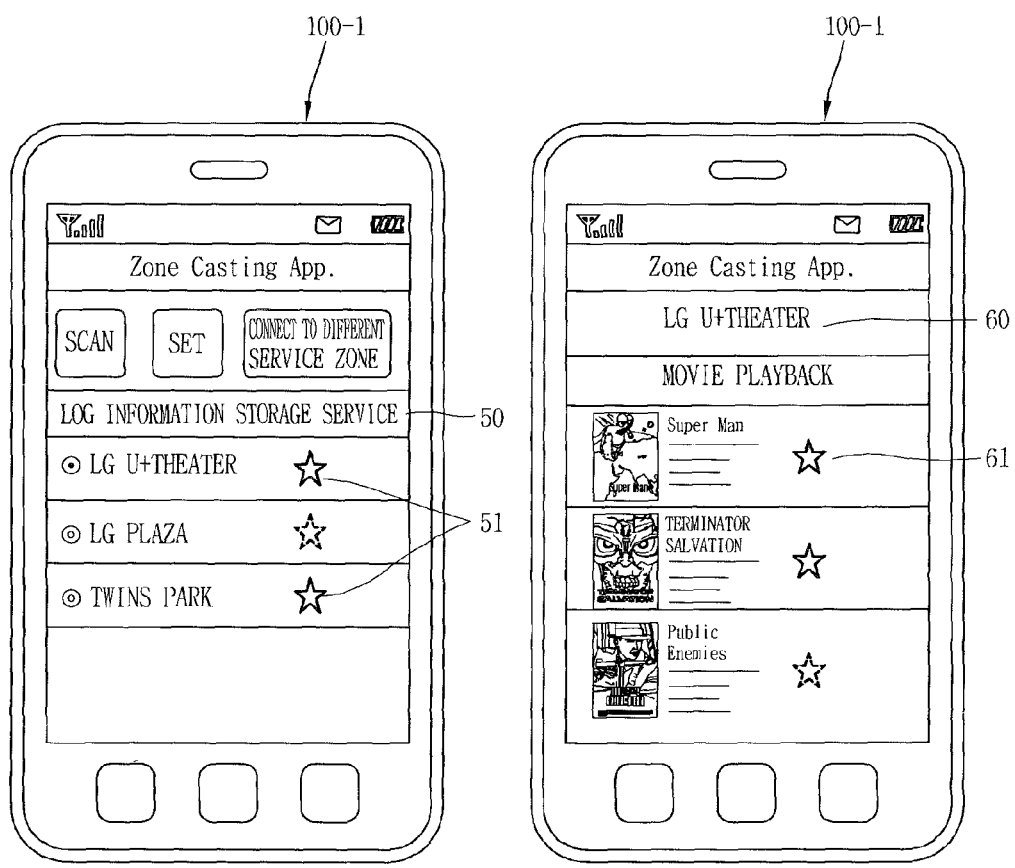
FIG. 6 is an exemplary view of a method for setting to collect log information of services in memory by the controller of the terminal an exemplary embodiment disclosed in the present document.

FIG. 6 is an exemplary view of a method for setting to collect log information of services in memory by the controller of the terminal an exemplary embodiment disclosed in the present document. With reference to FIG. 6, a method for collecting log information of the services by the controller 180 of the terminal 100-2, which is located outside the service zone, in order to display the services provided in the service zone will now be described.

The controller 180 of the terminal 100 may provide control to store log information regarding services selected from among zone casting services provided in the particular service zone 300 according to a user input or all the services accessible within the service zone.

With reference to FIG. 6(a), for example, the controller 180 of the terminal 100 may provide control to display, on the display unit 150, a log information setting screen 50 for receiving an input from a user for setting a service to be logged. The controller 180 may receive a signal from a user for selecting services displayed on the display unit and set the services selected by the select signal to be logged as log information collection targets. Thereafter, the controller 180 may provide control to display the information 51 indicating the service is set to be logged when the controller 180 displays the connection information of the services, for example, connection information of the services related to theater and the amusement park.

In addition, the controller 180 may set a service used within the service zone to be logged as a target for storing log information, or may set all the services accessible within the service zone to be logged as targets for storing log information (not shown).

As described above, the controller 180 may receive and store the log information of the services that are set to be logged as targets for storing log information when the terminal 100-1 is located within the service zone for the services. Nonetheless, it is not excluded that the controller 180 may receive and store log information of the services if the terminal 100 is able to receive and store the log information even from the outside of the service zone.

With reference to FIG. 6(b), for example, when the terminal 100-1 is provided with a service by using the zone casting application within the service zone, the controller 180 may provide control to display an execution screen 60 of the zone casting application, and when an input for selecting a service or a detailed service included in the execution screen 60 is received from the user, the controller 180 may set the selected service or detailed service as a target for storing log information. Similarly, when connection information of the services or detailed services set as described above are displayed, the controller 180 may provide control to display information 61 indicating the log information collection targets.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A terminal comprising:
   a memory;
   a wireless communication unit;
   a display; and
   a controller configured to:
   store log information for a service provided within a service zone in the memory,
   wherein the service is provided by a wireless communication between the wireless communication unit and an access point corresponding to the service zone, and
   wherein the log information for the service is received via the wireless communication unit communicated with the access point;
   search at least one of access points corresponding to one or more service zones where the terminal is positioned, wherein the terminal is out of the service zone, and the service zone is not part of the one or more service zones; and
   display a service list including information related to the one or more service zones corresponding to the searched at least one of access points and at least part of the stored log information related to the service zone corresponding to the access point while the terminal is positioned within the one or more service zones.

2. The terminal of claim 1, wherein the log information includes at least one of a name of the service, a usage time of the service, or connection information of the service.

3. The terminal of claim 2, wherein the controller is further configured to: perform a search of the connection information with a search factor; and display a result of the search of the connection information on the display.

4. The terminal of claim 3, wherein the search factor includes a service usage time, usage counts by the service zone, a favorites list of the service, or a search word.

5. The terminal of claim 1, wherein the at least one of access points corresponding to the one or more service zones is searched when a service request is received based on a user's selection.

6. The terminal of claim 5, wherein the service request is received when a touch input applied to an icon for receiving the service request.

7. The terminal of claim 1, wherein if the at least one of access points is searched, graphic information for notifying existence of at least one access point is displayed.

8. The terminal of claim 1, wherein the one or more service zones is one or more area in which a basic service set is formed by the at least one of access points.

9. The terminal of claim 1, wherein information for indicating that the service related to the service zone cannot be used from the outside of the service zone is displayed near the at least part of the stored log information.

10. A method for providing a service of a terminal, the method comprising:
    storing log information for a service provided within a service zone,
    wherein the service is provided by a wireless communication between a wireless communication unit and an access point corresponding to the service zone, and
    wherein the log information for the service is received via the wireless communication unit communicated with the access point;
    searching at least one of access points corresponding to one or more service zones where the terminal is positioned, wherein the terminal is out of the service zone, and the service zone is not part of the one or more service zones; and
    displaying a service list including information related to the one or more service zones corresponding to the searched at least one of access points and at least part of the stored log information related to the service zone corresponding to the access point while the terminal is positioned within the one or more service zones.

11. The method of claim 10, wherein the log information includes the name of the service, a usage time of the service, or connection information of the service.

12. The method of claim 10, further comprising:
    performing a search of connection information with a search factor; and
    displaying a result of the search of the connection information,
    wherein the search factor includes a service usage time, usage counts by the service zone, a favorites list of the service, and a search word.

13. The method of claim 10, wherein the at least one of access points corresponding to the one or more service zones is searched when a service request is received based on a user's selection.

14. The method of claim 13, wherein the service request is received when a touch input applied to an icon for receiving the service request.

15. The method of claim 10, wherein if the at least one of access points is searched, graphic information for notifying existence of at least one access point is displayed.

16. The method of claim 10, wherein the one or more service zones is one or more area in which a basic service set is formed by the at least one of access points.

17. The method of claim 10, wherein information for indicating that the service related to the service zone cannot be used from the outside of the service zone is displayed near the at least part of the stored log information.

* * * * *